3,347,633
CARBON BLACK MANUFACTURE
Paul H. Johnson, Bartlesville, Okla., assignor to Phillips Petroleum Company, a corporation of Delaware
No drawing. Filed Dec. 31, 1962, Ser. No. 248,197
5 Claims. (Cl. 23—209.4)

This invention relates to the production of carbon black by pyrolysis and/or partial combustion of a carbonaceous material. In one aspect the invention relates to a process for producing furnace carbon black having properties similar to those of channel carbon black. In another aspect it relates to a novel feed stock for a furnace carbon black process.

It is known to produce carbon black by contacting a liquid hydrocarbon, for example, a gas oil, in a highly dispersed form, with hot combustion gases in a furnace. One preferred process for producing carbon black by this method uses a reaction system of two cylindrical sections, one short section of large diameter, referred to hereinafter as the "combustion chamber," and an elongated section of considerably smaller diameter, referred to hereinafter as the "reaction chamber." The two chambers are coaxial and in open communication with each other. The combustion chamber is provided with at least one tangential inlet through which a combustible mixture of fuel and oxidant are admitted to form a swirling body of hot combustion gas which travels in a generally helical path into and through the reaction chamber, thus providing a zone maintained at a carbon black forming temperature. A carbonaceous feed injected longitudinally and axially into the combustion chamber reacts to form carbon black. Fuel referred to herein includes any combustible hydrocarbon gas or vaporized hydrocarbon such as a vaporized hydrocarbon oil. By combustion gases is meant such gases as result from the chemical reactions of burning under the particular circumstances existing in the combustion zone. The combustion gases and the reactant hydrocarbon or "make" hydrocarbon pass through the combustion chamber and reaction chamber in a state of sufficient annular separation to prevent carbon deposition of the cylindrical walls thereof. The tangentially added mixture is injected at sufficient velocity to flow spirally inward in the combustion chamber and substantially helically through the reaction chamber. These gases have sufficient centrifugal force to maintain a layer of the combustion gas adjacent the reaction chamber wall and accordingly prevent deposition of carbon upon this wall. The reactant hydrocarbon is converted or decomposed to carbon black by heat transferred to it by mixing at the interface between the hydrocarbon and the combustion gases and/or by radiation. The process is generally referred to as a tangential flame process of the precombustion type. Upon issuing from the reactor, the gaseous effluent carrying the carbon black is cooled, and the carbon black separated therefrom by any usual means old in the art, such as running the effluent through bags to screen out the carbon black, or by running the effluent through an electrical precipitator or through cyclone separators.

Carbon black made by the furnace process such as the tangential flame process of the precombustion type above described is generally characterized as having high structure whereas carbon black made by open flame decomposition, such as channel black, is generally characterized as low structure carbon black.

The term "structure" is the property of carbon black resulting from a linking together of some of the particles of carbon to form chains or clusters. In some cases it has been found that the carbon particles are linked together by carbon rods. This linking together has been called "recticulate chain structure" or simply "structure." The ability of a carbon black of a particular particle size range to absorb oil has been set up as a test for, and measure of, structure.

It is an object of this invention to provide a novel process for producing carbon black. It is an object of this invention to provide a process for the manufacture of carbon black having specific improved properties. It is also an object of this invention to provide a novel feed stock for the furnace process of making carbon black. A further object of this invention is to provide a method for making furnace carbon black characterized by having low structure characteristics as compared to conventional furnace carbon black. An improved method for adding an alkali metal to the feed stock of a carbon black furnace is yet another object of this invention. Other objects and advantages of this invention will become apparent to one skilled in the art upon studying this disclosure including the detailed description of the invention.

The invention contemplates the preparation of an alkali metal sulfonate of a propane-fractionated, solvent-extracted and dewaxed Mid-Continent bright stock of about 200 to 230 SUS at 210° F., having a viscosity index of at least about 90 and incorporating the alkali metal petroleum sulfonate in the feed stock to a carbon black-producing furnace in an amount sufficient to alter substantially the properties of the carbon black produced. The carbon black produced according to the process of the invention is characterized by having lower structure as shown by its oil absorption property and at the same time displaying greater surface area as shown by its nitrogen adsorption properties. Rubber, and particularly synthetic rubber, reinforced with the carbon black of my invention is characterized by having lower modulus properties and higher tensile strength properties with little or no change being observed in other properties of the rubber. Furthermore, the high surface area of the carbon black made according to my invention makes this carbon black particularly suitable in gas adsorption application.

It has been established that the presence of a small concentration of potassium ions or, to a lesser extent, ions of the other alkali metals, in the decomposition of normally liquid hydrocarbons to carbon black generally results in a product of lowered structure. As far as effectiveness is concerned it makes little difference how the alkali metal is introduced into the reaction zone along with the reactant hydrocarbon and therefore alkali metal compounds, usually as aqueous solution of those compounds, are generally added to the feed stream being introduced into the carbon black furnace. Such procedure requires that the mixture of reactant hydrocarbon and aqueous alkali metal solution be maintained in constant agitation in order to present a relatively uniform concentration of alkali metal in the reaction zone. If the feed stream to the carbon black furnace is preheated to a temperature substantially above the boiling point of water, the problem of maintaining a reasonably uniform concentration of alkali metal is compounded. According to the process of the invention the oil-soluble alkali metal sulfonate can be dissolved in the reactant hydrocarbon and the amount of alkali metal in the feed stock can be accurately controlled with assurance that the alkali metal will be uniformly distributed in the feed stock and throughout the reaction zone.

The hydrocarbon constituents of the alkali metal sulfonate are believed to contribute to the beneficial effects of the alkali metal on the carbon black because the carbon black produced from a feed stream containing the alkali metal sulfonate according to this invention is superior to the carbon black wherein the feed stream contains an organic alkali metal compound other than the above-identified alkali metal sulfonate.

The starting material for preparing the alkali metal sulfonate is a propane-fractionated, solvent-extracted and dewaxed Mid-Continent oil of about 200 to 230 SUS at 210° F. having a viscosity index of about 85 to 95 or even higher. In the sulfonation step the oil is intimately contacted with a sulfonation agent of which 20 percent fuming sulfuric acid or liquid sulfur trioxide dissolved in liquid sulfur dioxide is especially suitable. A temperature within the range of 50 to 200° F. and preferably 130 to 150° F. is maintained during the sulfonation reaction together with an acid-to-oil weight ratio of 0.175:1 to 1:1 based on 20 percent fuming sulfuric acid. An acid-to-oil weight ratio of about 0.3:1 to about 0.6:1 is preferred from a standpoint of yield and reaction rate. The sulfonation agent is preferably added to the oil as rapidly as possible and with vigorous agitation. The agitation is continued only so long as is required to assure satisfactory dispersion of the sulfonation agent in the oil. When fuming sulfuric acid is utilized as the sulfonation agent, the reaction mixture is allowed to rest in a quiescent state for about 10 to 90 minutes after which it is neutralized with an excess of the desired metal oxide or hydroxide. When liquid sulfur trioxide in liquid sulfur dioxide is the sulfonation agent, the reaction mixture can be immediately neutralized after sufficient agitation of the oil and sulfonation agent to assure satisfactory dispersion of the sulfonation agent in the oil.

The reaction mixture can be neutralized directly with the alkali metal oxide or hydroxide or, in the alternative, the reaction mixture can be neutralized with any desired metal oxide or hydroxide such as calcium hydroxide after which the calcium is displaced by the desired alkali metal by a base exchange process.

The alkali metal sulfonate can be sodium sulfonate; potassium sulfonate; lithium sulfonate; rubidium sulfonate; cesium sulfonate; or francium sulfonate; however, the potassium sulfonate is preferred and is generally utilized for reducing the property of structure in a furnace carbon black.

The following example will be helpful in attaining an understanding of the invention but should not be construed to limit the invention unduly.

*Example*

Oil samples were converted to carbon black by the tangential flame process of the precombustion type in separate runs wherein operating conditions were maintained substantially the same in each of the runs. The apparatus employed was substantially as shown in Figure 1 of U.S. Patent 2,564,700, issued Aug. 21, 1951, to J. C. Krejci.

The properties of the oil samples utilized as reactant oil in the runs are shown in Table I.

TABLE I.—PROPERTIES OF REACTANT OILS

|  | A | B |
|---|---|---|
| API Gravity | 11.0 | 10.8 |
| Vacuum Distillation, ° F. at 760 mm.: | | |
| First Drop | 470 | 460 |
| 5 | 558 | 563 |
| 10 | 587 | 595 |
| 20 | 611 | 623 |
| 30 | 639 | 648 |
| 40 | 660 | 608 |
| 50 | 681 | 690 |
| 60 | 711 | 712 |
| 70 | 761 | 751 |
| 80 | 820 | 795 |
| 82 | 867 | 868 |
| Bureau Mines Correlation Index | 90.4 | 90.5 |
| Viscosity: | | |
| SUS at 100° F | 81.9 | 85.3 |
| SUS at 210° F | 37.6 | 36.0 |
| Carbon, Wt. Percent | 88.8 | 89.2 |
| Hydrogen, Wt. Percent | 9.5 | 9.5 |
| Sulfur, Wt. Percent | 1.29 | 1.56 |
| Ramsbottom Carbon Residue, Wt. Percent | 1.61 | 1.70 |
| BS&W, Vol. Percent | 0.17 | ---- |
| Pentane Insoluble, Wt. Percent | 0.44 | 0.20 |
| Pour Point, ° F | 45 | +40 |
| Aniline Point, ° F | 93.6 | 98 |
| Refractive Index, 20/D | 1.5854 | 1.5835 |

The significant properties of the carbon black produced in the runs are shown in Table II.

TABLE II

| Run No. | Reactant Oil | K Content, p.p.m. | Oil Rate, gal./hr. | Photelometer | Yield, lb./gal. | $N_2$ Surface Area, $m.^2/g.$ | Oil Absorp., cc./g. |
|---|---|---|---|---|---|---|---|
| 1 | A | 0 | 6.20 | 91 | 2.80 | 135.3 | 1.45 |
| 2 | A | 52.5 | 5.92 | 91 | 2.70 | 140.4 | 0.88 |
| 3 | B | 0 | 5.80 | 88 | ---- | 139.0 | 1.41 |
| 4 | B | 52.5 | 5.72 | 92 | 2.52 | 146.5 | 0.92 |
| 5 | B | 52.5 | 5.92 | 91 | 2.74 | 137.1 | 0.87 |

The oil absorption value of the carbon black made with the potassium-containing reactant hydrocarbon was, in each case, less than when no potassium was utilized. The nitrogen absorption value of the carbon black was increased by utilizing potassium in the reactant hydrocarbon and was increased substantially more when the sulfonate was used than when the naphthenate was used.

A propane-fractionated, solvent-extracted bright stock derived from Mid-Continent crude, having a viscosity of about 205 SUS at 210° F. and a viscosity index of 93 was sulfonated with liquid $SO_3$ dissolved in liquid $SO_2$. The sulfonic acids produced were diluted with naphtha, neutralized with calcium hydroxide (lime) and the neutralized product was dehydrated. A 50-pound portion of the dry product, containing 40 weight percent calcium petroleum sulfonate, was treated with 20 lb. water containing 5 lb. of $K_2SO_4$ at 180° F. overnight and then dried in a packed column with stripping steam at 250–260° F. The resulting potassium sulfonate was then filtered and the naphtha was removed in a packed vacuum column (28" $H_2O$) at a bottom temperature of 360° F. and a top temperature of 345° F.

The reactant hydrocarbon of Runs 2 and 4 contained 0.262 weight percent of the above potassium petroleum sulfonate and the reactant hydrocarbon of Run 5 contained 0.07 weight percent of potassium naphthenate, obtained as a commercial product so that each of the reactant hydrocarbon feed stocks contained 52.5 p.p.m. of K by weight. The reactant oils of Runs 1 and 3 contained no potassium. The potassium sulfonate contained 2 weight percent K and the potassium naphthenate contained 7.5 weight percent K.

Samples of the carbon black of Runs 3, 4 and 5 were compounded in natural rubber (#1 smoked sheet) and in butadiene/styrene rubber prepared by emulsion polymerization at 122° F. in a fatty acid soap emulsified recipe and coagulated with salt acid. The compounding recipes are shown in Table III.

TABLE III

| Component | Parts by Weight | |
|---|---|---|
| | Natural Rubber | Synthetic Rubber |
| Natural Rubber | 100 | |
| Butadiene/styrene | | 100 |
| Carbon black | 40 | 40 |
| Stearic Acid | 3 | |
| Zinc Oxide | 5 | 3 |
| Altax [1] | 0.6 | |
| Sulfur | 2.5 | 1.75 |
| BRT #7 [2] | 6 | |
| Santocure [3] | | 0.9 |

[1] 2,2'-dibenzothiazyl disulfide.
[2] Refined coal-tar product; nontoxic, dark-colored, viscous liquid; sp. gr., 1.20–1.25; Engler specific viscosity at 100° C., 6–9.
[3] N-cyclohexyl-2-benzothiazolesulfenamide.

The stocks were milled, cured as indicated in Tables IV and V and the physical properties were determined. Results are shown in Tables IV and V.

TABLE IV.—PROPERTIES OF NATURAL RUBBER CURED 20 MINUTES AT 293° F.

| | Potassium Sulfonate | Potassium Naphthenate |
|---|---|---|
| Cross-link density, $\mu \times 10^4$, mols/cc | 1.51 | 1.11 |
| 300— Modulus, p.s.i | 1,390 | 1,510 |
| Tensile, p.s.i | 4,480 | 4,495 |
| Elongation, percent | 600 | 580 |

The carbon black produced in the presence of the potassium sulfonate decreased the 300% modulus of the rubber as compared to the carbon black made in the presence of potassium naphthenate.

TABLE V.—PROPERTIES OF BUTADIENE/STYRENE RUBBER CURED 30 MINUTES AT 307° F.

| | Potassium Sulfonate | Potassium Naphthenate | No Potassium |
|---|---|---|---|
| Cross-link density, $\mu \times 10^4$, mols/cc | 1.58 | 1.62 | 1.84 |
| 300— Modulus, p.s.i | 940 | 1,060 | 1,700 |
| Tensile, p.s.i | 3,600 | 3,270 | 3,285 |
| Elongation, percent | 585 | 545 | 450 |
| $\Delta T$, ° F | 63.2 | 62.8 | 62.5 |
| Resilience, percent | 56.8 | 57.8 | 60.1 |

In the rubber samples containing carbon black produced in the presence of potassium sulfonate the modulus was substantially lower and the tensile was substantially higher than in the other samples tested. Rubber containing carbon black produced according to the invention is particularly suitable for the manufacture of tires having "low-squeal" properties and is also suitable for the manufacture of inner tubes for tires.

The sulfonate of the invention can be added in an amount sufficient to include from 1.5 to 1000 p.p.m. by weight of alkali metal to the feed to the carbon black process. The amount of alkali metal added will usually, however, be in the range of about 5 to 500 p.p.m. by weight.

That which is claimed is:

1. A process for producing carbon black which comprises charging to a carbon black furnace at carbon black forming conditions a fluid hydrocarbon containing the alkali metal sulfonate of a propane-fractionated, solvent-extracted and dewaxed Mid-Continent bright stock of about 200 to 230 SUS at 210° F., having a viscosity index of at least about 90 in an amount sufficient to impart from about 1.5 to 1000 p.p.m. by weight of alkali metal in said fluid hydrocarbon.

2. The process of claim 1 wherein the alkali metal sulfonate is potassium sulfonate.

3. A feed stock for a carbon black furnace comprising a gas oil, having a Bureau of Mines Correlation Index of at least about 90, containing an alkali metal sulfonate of a propane-fractionated, solvent-extracted, dewaxed Mid-Continent bright stock of about 200 to 230 SUS at 210° F. having a viscosity index of at least about 90, said alkali metal sulfonate being present in an amount sufficient to impart about 1.5 to 1000 p.p.m. by weight of alkali metal to the feed stock.

4. The feed stock of claim 3 wherein the alkali metal sulfonate is potassium sulfonate.

5. The process of claim 1 wherein the alkali metal sulfonate is potassium sulfonate and is added to the hydrocarbon feed in an amount sufficient to impart from about 5 to 500 p.p.m. by weight of potassium.

References Cited

UNITED STATES PATENTS

| 2,125,305 | 8/1938 | Murphy | 252—33 |
| 2,412,916 | 12/1946 | Showalter | 260—504 |
| 2,527,987 | 10/1950 | Caron et al. | 44—68 X |
| 2,626,207 | 1/1953 | Wies et al. | 44—68 |
| 2,848,415 | 8/1958 | Logan | 252—33 |
| 2,865,957 | 12/1958 | Logan | 252—33 X |
| 2,884,445 | 4/1959 | Axe et al. | 252—33 X |
| 2,947,694 | 8/1960 | Gragson | 252—33 |
| 3,010,794 | 11/1961 | Friauf et al. | 23—209.4 |
| 3,201,200 | 8/1965 | Voet et al. | 23—209.4 |

OSCAR R. VERTIZ, *Primary Examiner.*

E. J. MEROS, *Assistant Examiner.*